(12) United States Patent
Oh et al.

(10) Patent No.: US 12,027,875 B2
(45) Date of Patent: Jul. 2, 2024

(54) COIL-BASED ELECTROMAGNETIC WAVE RESONANCE TRANSFER DEVICE FOR IMPROVING ENERGY EFFICIENCY

(71) Applicants: Young Jun Oh, Wonju-si (KR); Kyung Sun Na, Seoul (KR)

(72) Inventors: Young Jun Oh, Wonju-si (KR); Kyung Sun Na, Seoul (KR); Joong Kyun Na, Seoul (KR); Yong Hwang Ha, Goesan-gun (KR)

( * ) Notice: Subject to any disclaimer, the term of this patent is extended or adjusted under 35 U.S.C. 154(b) by 348 days.

(21) Appl. No.: 17/437,637

(22) PCT Filed: Jan. 9, 2020

(86) PCT No.: PCT/KR2020/000418
§ 371 (c)(1),
(2) Date: Sep. 9, 2021

(87) PCT Pub. No.: WO2020/189887
PCT Pub. Date: Sep. 24, 2020

(65) Prior Publication Data
US 2022/0140656 A1    May 5, 2022

(30) Foreign Application Priority Data
Mar. 19, 2019    (KR) .......................... 10-2019-0031267

(51) Int. Cl.
*H02J 50/12*    (2016.01)
*H01F 27/02*    (2006.01)
(Continued)

(52) U.S. Cl.
CPC .............. *H02J 50/12* (2016.02); *H01F 27/02* (2013.01); *H01F 27/027* (2013.01); *H01F 27/28* (2013.01); *H02J 50/005* (2020.01); *F02M 27/04* (2013.01)

(58) Field of Classification Search
None
See application file for complete search history.

(56) References Cited

U.S. PATENT DOCUMENTS

| 2016/0141884 A1* | 5/2016 | Lee .......................... H02J 50/90 |
| | | 307/104 |
| 2017/0126283 A1 | 5/2017 | Rehm |

FOREIGN PATENT DOCUMENTS

| EP | 2752960 A2 * | 7/2014 | .............. H02J 5/005 |
| EP | 2752960 A2 | 7/2014 | |

(Continued)

OTHER PUBLICATIONS

English Specification of 10-2017-0027284.
(Continued)

*Primary Examiner* — Daniel Kessie
(74) *Attorney, Agent, or Firm* — ANTONIO HA & U.S. PATENT, LLC

(57) ABSTRACT

The present invention relates to a coil-based electromagnetic wave resonance transfer device for improving energy efficiency, which comprises: a housing; an electronic circuit board which is installed in the housing and senses an external signal generated outside the housing, to generate an electric wave signal having a specific waveform, of which a frequency is adjusted by using a multi-frequency modulation method; and a coil member which is installed in the housing and generates a resonant magnetic field through the electric wave signal output from the electronic circuit board to output an electromagnetic resonance wave to the outside of the housing.

9 Claims, 12 Drawing Sheets

(51) Int. Cl.
    *H01F 27/28*     (2006.01)
    *H02J 50/00*     (2016.01)
    *F02M 27/04*     (2006.01)

(56) References Cited

FOREIGN PATENT DOCUMENTS

| | | |
|---|---|---|
| JP | H1073570 A | 3/1998 |
| JP | 2011-030422 A | 2/2011 |
| JP | 2016-003894 A | 1/2016 |
| KR | 10-2010-0118793 | 11/2010 |
| KR | 10-2016-0089267 | 7/2016 |
| KR | 10-2017-0027284 | 3/2017 |

OTHER PUBLICATIONS

English Specification of 10-2016-0089267.
English Specification of JP2016-003894A.
English Specification of JP2011-030422A.
English Specification of EP2752960A2.
English Specification of JPH1073570A.
English Specification of 10-2010-0118793.

\* cited by examiner

COIL-BASED ELECTROMAGNETIC WAVE RESONANCE TRANSFER DEVICE FOR IMPROVING ENERGY EFFICIENCY

TECHNICAL FIELD

Embodiments of the present invention relate to a coil-based electromagnetic wave resonance transfer device for enhancing energy efficiency.

BACKGROUND ART

A typical power generation and transmission device includes an internal combustion engine or an induction motor. An example of the internal combustion engine is an automobile engine. It is known that the engine efficiency of a vehicle is between about 25% and about 35% but, after passing through power transmission devices (e.g., gears), the final efficiency of actually moving the vehicle is reduced to about 15%. Most of the power is lost as friction and exhaust heat.

A large portion of energy loss in automobile engines is energy loss due to friction between energy transmission devices.

The inventors have paid attention to the mechanical structure of the combustion engine that rotates and reciprocates very quickly. It is known that when two objects positioned near each other pass by each other at high speed, static electricity is generated and then released, but if the objects are metal, the generated static electricity is not immediately released.

Static electricity generated by such high-speed movement may not be sufficiently released but accumulated in the vehicle, causing eddy current and electromagnetic attraction and repulsion. The static electricity forms an electromagnetic field, which then creates an eddy current, which heats up the vehicle body and its mechanical structure of the vehicle body, resulting in energy loss.

Moreover, the electrostatic attraction and repulsion may slightly twist or distort the engine's rotation shaft and various power transmission devices, causing the vehicle to generate noise or vibration while traveling at high speed and hence deteriorating comfort. Further, the resultant rise in temperature inside the engine leads to reaction between nitrogen and oxygen in the sucked-in air, causing nitrogen oxides (NOx) which causes environmental contamination and harms human health.

Meanwhile, exhaust heat loss occurs while the incompletely burned hot exhaust gas is re-oxidized outside the cylinder of the internal combustion engine. The combustion time in the cylinder of the engine is too short to completely burn the injected fuel. There have been vigorous research efforts to raise the combustion rate.

Only a portion of the injected fuel is completely burned in the cylinder of the internal combustion engine, but the rest is not. To remove such incomplete combustion, reburning is performed by a catalyst device provided outside the cylinder, thereby preventing emissions of toxic gases. Incomplete combustion may reduce energy efficiency, and soot particles passed through the old catalyst device may cause significant environmental hazards.

The inventors focused on how to reduce exhaust emissions due to incomplete combustion. For high RPM (revolution per minute) internal combustion engines, a very short combustion time, e.g., 0.03 sec (for 4-stroke, 2,000 RPM internal combustion engines), is given.

It is impossible for the fuel to completely burn within this time. For this reason, the optimum speed for automobile efficiency is usually 1,500 RPM to 1,800 RPM. There are approaches to raise combustion efficiency by reducing the fuel injection nozzle or by heating fuel, but they are still insufficient to overcome their own limitations.

How to increase combustion rate and decrease friction is a common subject for the automobile manufacturers all around the world, and thus, ceaseless research efforts are underway. In attempt to address such issues, there have been developed mechanical structures, controllers, and fuels.

The inventors paid attention to the issues and invented a coil-based electromagnetic wave resonance transfer device that may address the issues and is easily applicable to a number of types of vehicles already produced.

DETAILED DESCRIPTION OF THE INVENTION

Technical Problems

The present invention aims to provide a coil-based electromagnetic wave resonance transfer device that may enhance energy efficiency by removing frictional force due to attractive and repulsive forces generated during high-speed rotation of an internal combustion engine or induction motor.

When an internal combustion engine or an induction motor rotates at high speed, numerous electric charges are generated and accumulated by friction with air, high-speed motion of internal machines, friction between machines, and electric devices. The accumulated electric charge forms an electromagnetic field in a specific area of the device, the so-formed electromagnetic field induces an eddy current inside the metal, and the eddy current forms an electrical closed circuit inside the metal.

Therefore, heat is generated inside the metal and acts as a force that interferes with the movement of the machine. According to the present invention, it is possible to increase energy efficiency by removing frictional force due to electromagnetic attractive and repulsive forces by suppressing the generation of eddy current.

The present invention also aims to provide a coil-based electromagnetic wave resonance transfer device that may enhance energy efficiency by fuel micronization using a reduction in attractive force of fuel particles.

The combustion rate is the key to enhancing the engine's output and saving fuel, and the biggest cause of a decrease in combustion rate is the attraction between fuel molecules and the viscosity of the fuel. The attractive force between fuel particles is a Van der Waals force between chemically non-polar molecules, and it is possible to increase energy efficiency by weakening the attraction between fuel particles and micronizing the fuel using electromagnetic resonance waves.

Means to Address the Problems

To achieve the foregoing objectives, according to the present invention, a coil-based electromagnetic wave resonance transfer device for enhancing energy efficiency comprises a housing, an electronic circuit board installed inside the housing and sensing an external signal generated from an outside of the housing, and generating an electric wave signal of a frequency-adjusted specific waveform using a multi-frequency modulation scheme, and a coil member installed inside the housing, generating a resonant magnetic field through the electric wave signal output from the electronic circuit board, and outputting an electromagnetic resonance wave to the outside of the housing.

The housing may include a base on which the electronic circuit board and the coil member are installed and a cover coupled to an upper part of the base and sealing an inside of the base. The base may include a board seating part formed on a bottom of the base to seat the electronic circuit board thereon and a coil receiving unit formed in a side portion of the base to receive the coil member. The cover may include a display window to indicate whether the coil-based electromagnetic wave resonance transfer device operates.

The electronic circuit board may include a power supply unit receiving external power from the outside of the housing, generating constant voltage power, and supplying the constant voltage power to an inside of an electronic circuit, an external signal detection unit sensing an external signal generated from the outside of the housing, and an electric wave signal generation unit generating an electric wave signal of a specific frequency and waveform matching a frequency and waveform of the external signal sensed by the external signal detection unit.

The power supply unit may include an external power input module receiving external power from the outside of the housing, an external electronic wave blocking module blocking an external electronic wave introduced from the outside of the housing, a constant voltage generation module generating the constant voltage power using the external power input to the external power input module, and a constant voltage supply module supplying the constant voltage power generated by the constant voltage generation module to the inside of the electronic circuit.

The external signal detection unit may include an external magnetic field sensor sensing an external magnetic field generated outside the housing, as the external signal.

The electric wave signal generation unit may include an external magnetic field frequency/waveform detection module detecting a frequency and waveform of the external magnetic field sensed by the external signal detection unit, using the external magnetic field, an electric signal generation module generating an electric signal including a voltage signal or a current signal of a specific frequency and waveform matching the frequency and waveform of the external magnetic field detected by the external magnetic field frequency/waveform detection module, an electric signal amplification module amplifying the electric signal generated by the electric signal generation module, a switching power conversion module outputting an electric wave signal by switching-power-converting the electric signal amplified by the electric signal amplification module, and an integrated control module controlling the external magnetic field frequency/waveform detection module, the electric signal generation module, the electric signal amplification module, and the switching power conversion module. After receiving the frequency and waveform of the external signal detected by the external magnetic field frequency/waveform detection module, the integrated control module may control the electric signal generation module to generate the electric signal of the specific frequency and waveform matching the frequency and waveform of the external magnetic field using a multi-frequency modulation scheme through a preset control program.

The coil member may include a first output coil generating a resonant magnetic field using the electric wave signal output from the electronic circuit board and a second output coil having a vector opposite in direction to the first output coil and generating the resonant magnetic field using the electric wave signal output from the electronic circuit board. The coil receiving unit may include a first coil receiving groove formed in a side portion of the base to receive the first output coil and a second coil receiving groove formed in another side portion of the base to receive the second output coil.

The external signal detection unit may further include an optical sensor sensing external light generated from the outside of the housing, as the external signal. The optical sensor may sense the external light to generate an optical signal when the cover is removed from the base. The integrated control module may receive the optical signal output from the optical sensor and deactivate the control program.

The coil-based electromagnetic wave resonance transfer device may further comprise a resonant magnetic field sensing member installed inside the housing to sense the resonant magnetic field generated from the coil member. The resonant magnetic field sensing member may include a first sensor coil sensing a resonant magnetic field generated from the first output coil and a second sensor coil sensing a resonant magnetic field generated from the second output coil.

The base may further include a sensor receiving part formed, over the coil receiving unit, in a side portion of the base to receive the resonant magnetic field sensing member. The sensor receiving unit may include a first sensor receiving groove formed in a side portion of the base to receive the first sensor coil and a second sensor receiving groove formed in another side portion of the base to receive the second sensor coil.

The electric wave signal generation unit may include a resonant magnetic field frequency/waveform detection module detecting a frequency and waveform of a resonant magnetic field sensed by the resonant magnetic field sensing member, using the resonant magnetic field and a frequency/waveform comparison module comparing the frequency and waveform of the resonant magnetic field detected by the resonant magnetic field frequency/waveform detection module with the frequency and waveform of the external magnetic field detected by the external magnetic field frequency/waveform detection module. The frequency/waveform comparison module may generate a resonant magnetic field abnormality signal when the frequency and waveform of the resonant magnetic field differ from the frequency and waveform of the external magnetic field. The integrated control module may receive the resonant magnetic field abnormality signal from the frequency/waveform comparison module and deactivates the control program.

Upon receiving the optical signal output from the optical sensor or the resonant magnetic field abnormality signal output from the frequency/waveform comparison module, the integrated control module may activate an illuminating member or a sounding member installed in the housing to let a user know operation abnormality of the coil-based electromagnetic wave resonance transfer device.

Effects of the Invention

As described above, by the coil-based electromagnetic wave resonance transfer device for enhancing energy efficiency according to the present invention, it is possible to enhance energy efficiency by removing frictional force caused by electrostatic attractive and repulsive forces generated during high-speed rotation of an internal combustion engine or an induction motor, using low power consumption.

Further, according to the present invention, it is possible to enhance energy efficiency by fuel micronization using a reduction in attraction between fuel particles.

BEST MODE TO PRACTICE THE INVENTION

Hereinafter, embodiments of the present invention are described in detail with reference to the accompanying drawings. The same reference denotations may be used to refer to the same or similar elements throughout the specification and the drawings. When determined to make the subject matter of the present invention unclear, the detailed description of the known art or functions may be skipped.

In general, the accumulation of static charges in the device frame of an internal combustion engine or an induction motor means that a specific portion is positively or negatively charged. To release it, it is necessary to generate opposite charges and transmit them in real time to the portion where the static charges are accumulated. To that end, the present invention uses electromagnetic waves as a suitable means.

Electromagnetic waves instantaneously switch between positive and negative charge states and may thus move, and make changes to, the static charges accumulated in the device frame of the internal combustion engine or induction motor.

For a non-temporary, continuous effect without burdening the vehicle or machine, wavelengths, which are weak but diverse, rather than a monotonous wavelength of strong energy, are suitable. The present invention adopts the technique of rearrangement of a vibrational pattern in a lattice structure, which may maintain continuous resonance vibrations by forming a specific pattern in the device frame and using multi-frequency modulation technology.

Figure 1:
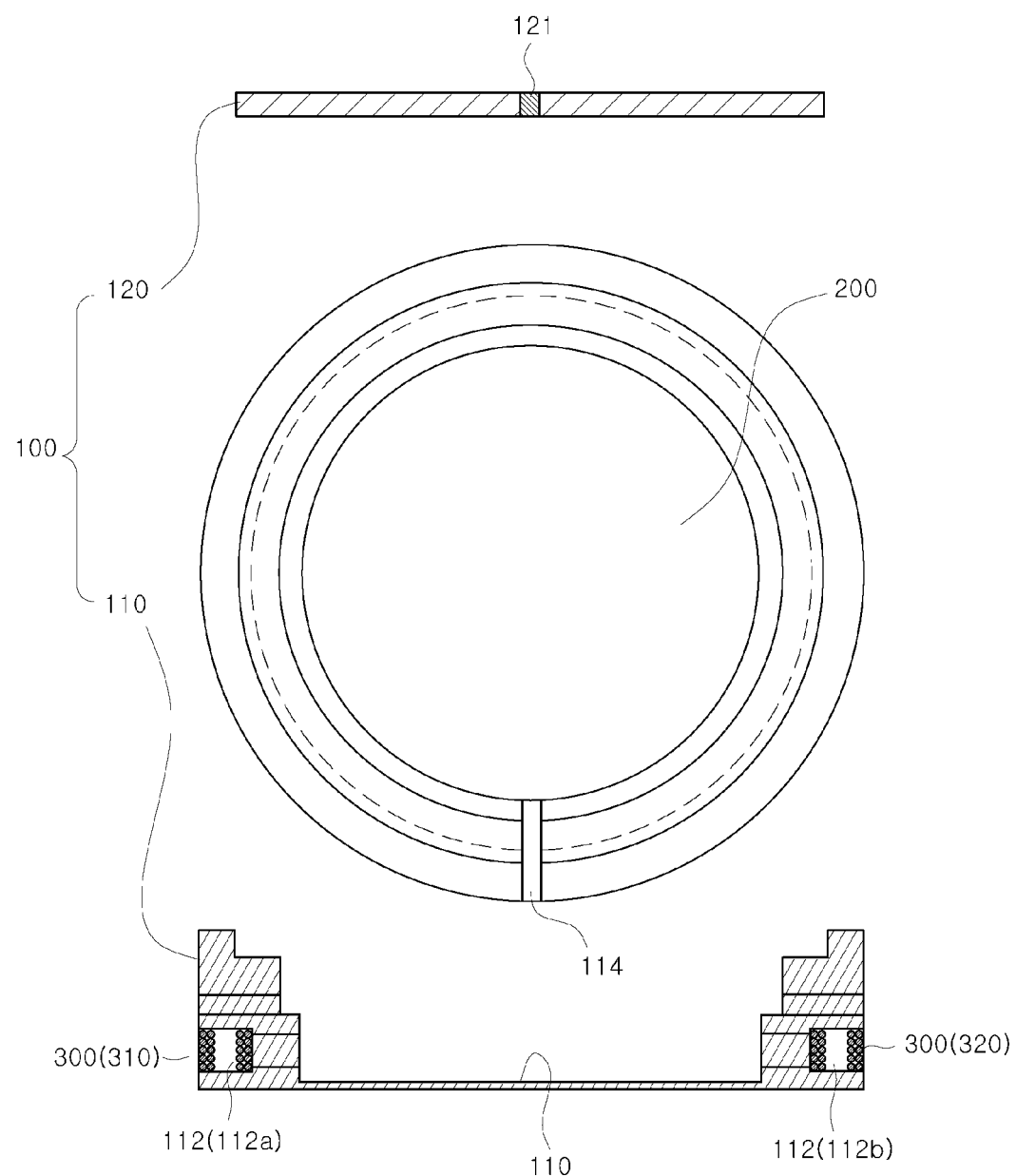
FIG. 1 is a first configuration view of a coil-based electromagnetic wave resonance transfer device for enhancing energy efficiency according to the present invention.

FIG. 1 is a first configuration view of a coil-based electromagnetic wave resonance transfer device for enhancing energy efficiency according to the present invention.

Referring to FIG. 1, according to the present invention, a coil-based electromagnetic wave resonance transfer device for enhancing energy efficiency includes a housing 100 and an electronic circuit board 200 and a coil member 300 installed inside the housing.

The housing 100 may receive the electronic circuit board and the coil member to protect the electronic circuit board and the coil member from external impact and may assist in smooth transfer, to the outside, of electromagnetic resonance waves generated through the electronic circuit board and the coil member. The housing may be formed of plastic, preferably acetal.

Specifically, the housing 100 may include a base 110 on which the electronic circuit board and the coil member are installed and a cover 120 coupled to the top of the base to seal the inside of the base.

The base 110 may be formed in a circular shape, and the base may include a board seating part 111 formed on a bottom surface thereof and a coil receiving part 112 formed in a side portion thereof.

Here, the board seating part 111 may seat the electronic circuit board on the bottom of the base, and the coil receiving part 112 may receive the coil member in a side portion of the base.

Figure 10:
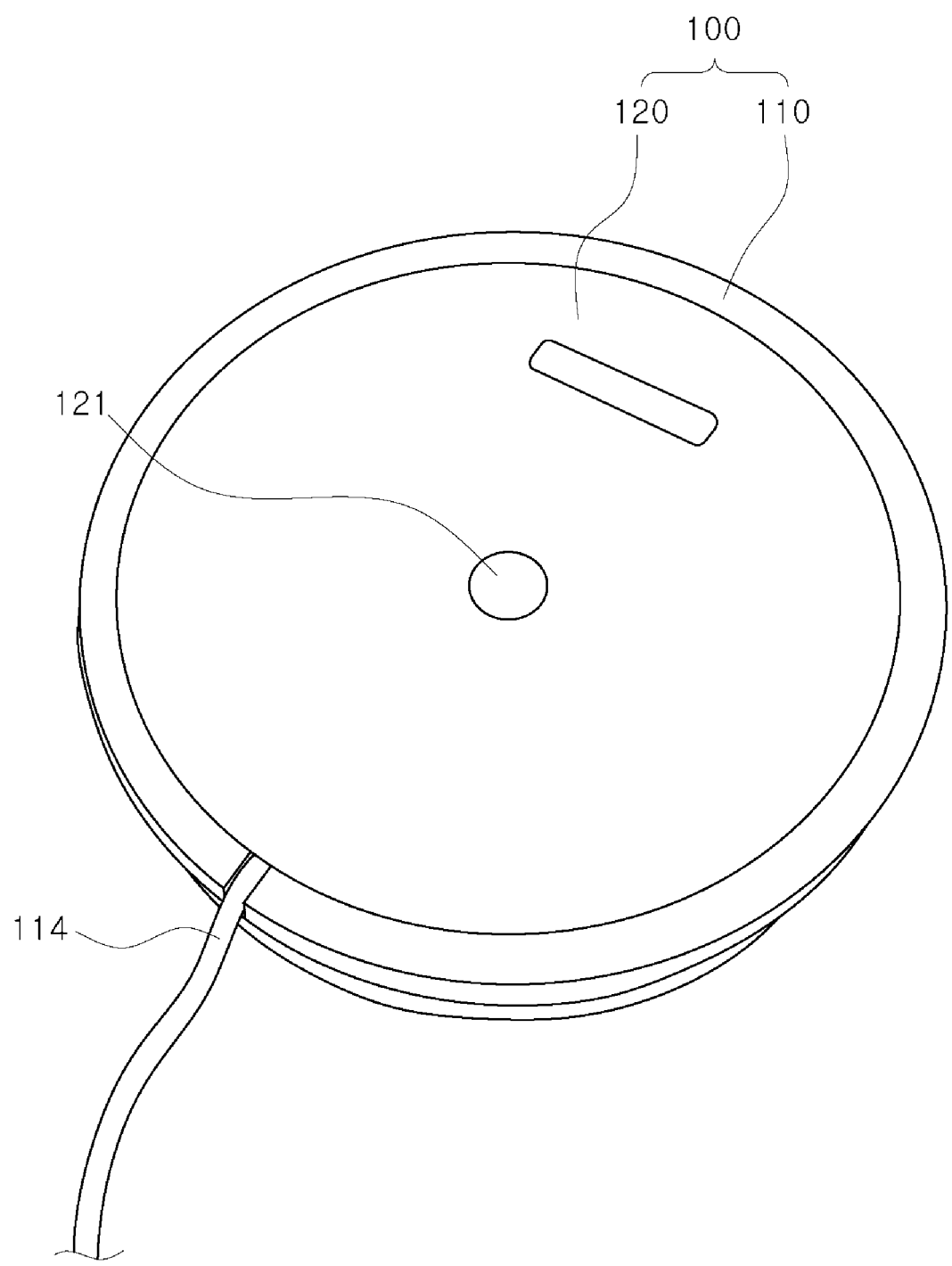
FIG. 10 is a view illustrating an external appearance of a coil-based electromagnetic wave resonance transfer device for enhancing energy efficiency according to the present invention.
Figure 11:
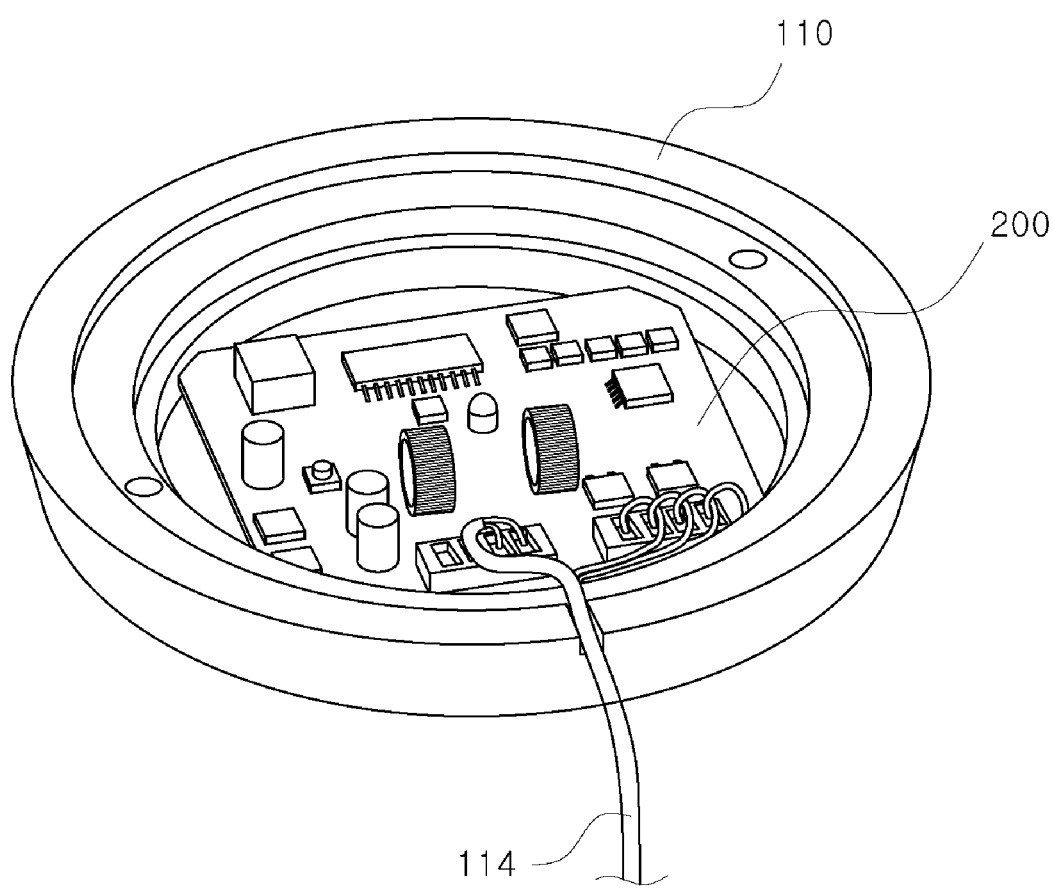
FIG. 11 is a view illustrating an internal appearance of a coil-based electromagnetic wave resonance transfer device for enhancing energy efficiency according to the present invention.

FIG. 10 is a view illustrating an external appearance of a coil-based electromagnetic wave resonance transfer device for enhancing energy efficiency according to the present invention. FIG. 11 is a view illustrating an internal appearance of a coil-based electromagnetic wave resonance transfer device for enhancing energy efficiency according to the present invention.

The base 110 further includes a cable guide part 114 in a front portion thereof. The cable guide part 114 may guide a cable for supplying external power to the electronic circuit board, e.g., a cigar jack cable connected with a cigar jack of a vehicle, as an external power source, as shown in FIGS. 10 and 11, into the inside of the base to allow the cigar jack cable to connect to the electronic circuit board 200.

Figure 12:
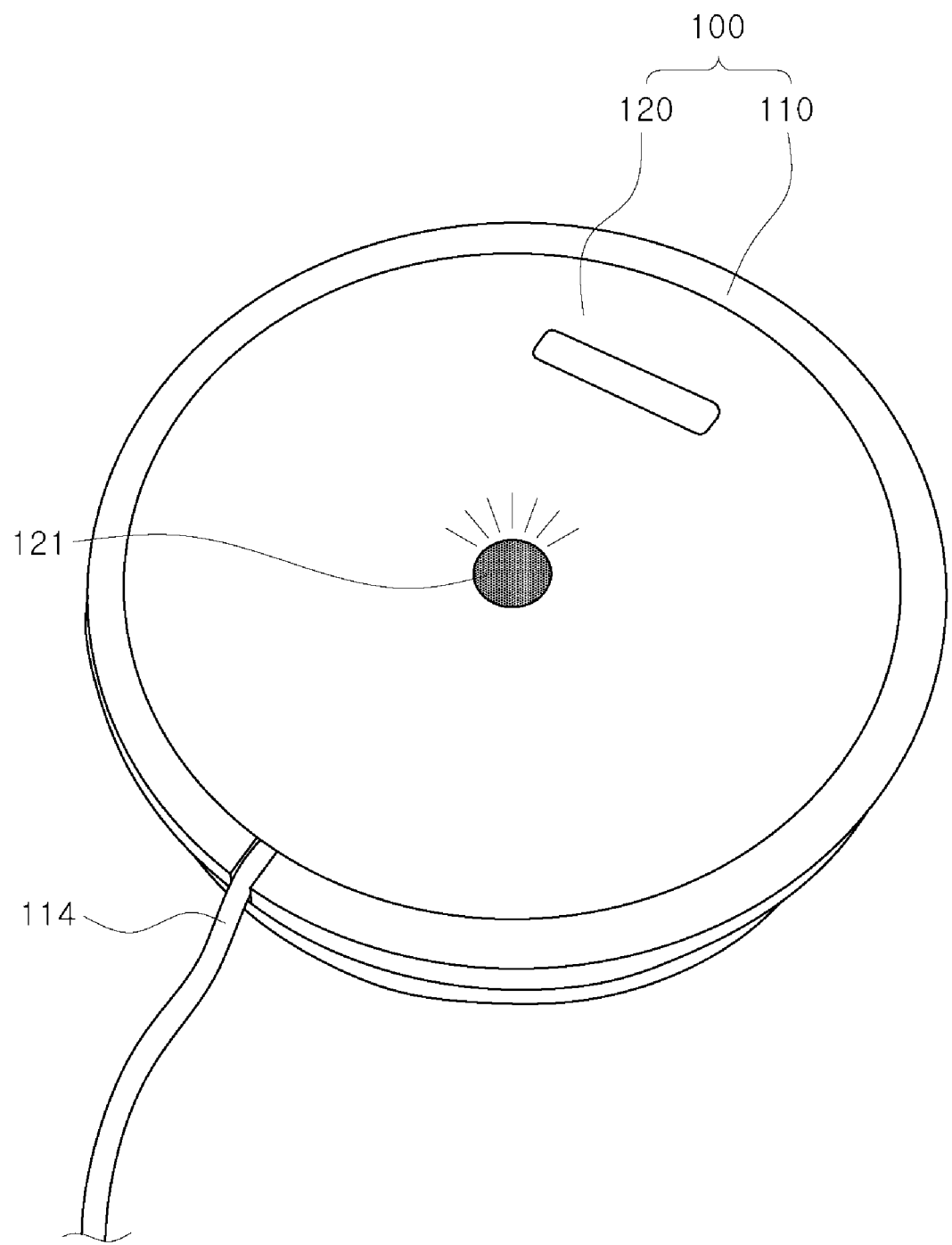
FIG. 12 is a view illustrating an operation of a coil-based electromagnetic wave resonance transfer device for enhancing energy efficiency according to the present invention.

FIG. 12 is a view illustrating an operation of a coil-based electromagnetic wave resonance transfer device for enhancing energy efficiency according to the present invention.

The cover 120 may be formed in a circular shape corresponding to the base. The cover 120 may include a display window 121 in the center to display an on/off or flicker of an illumination member (not shown) to the user to thereby let the user know whether the device is operated.

The electronic circuit board 200 may sense an external signal generated from outside of the housing and generate a frequency-adjusted specific waveform of electric wave signal using a multi-frequency modulation scheme.

Figure 2:
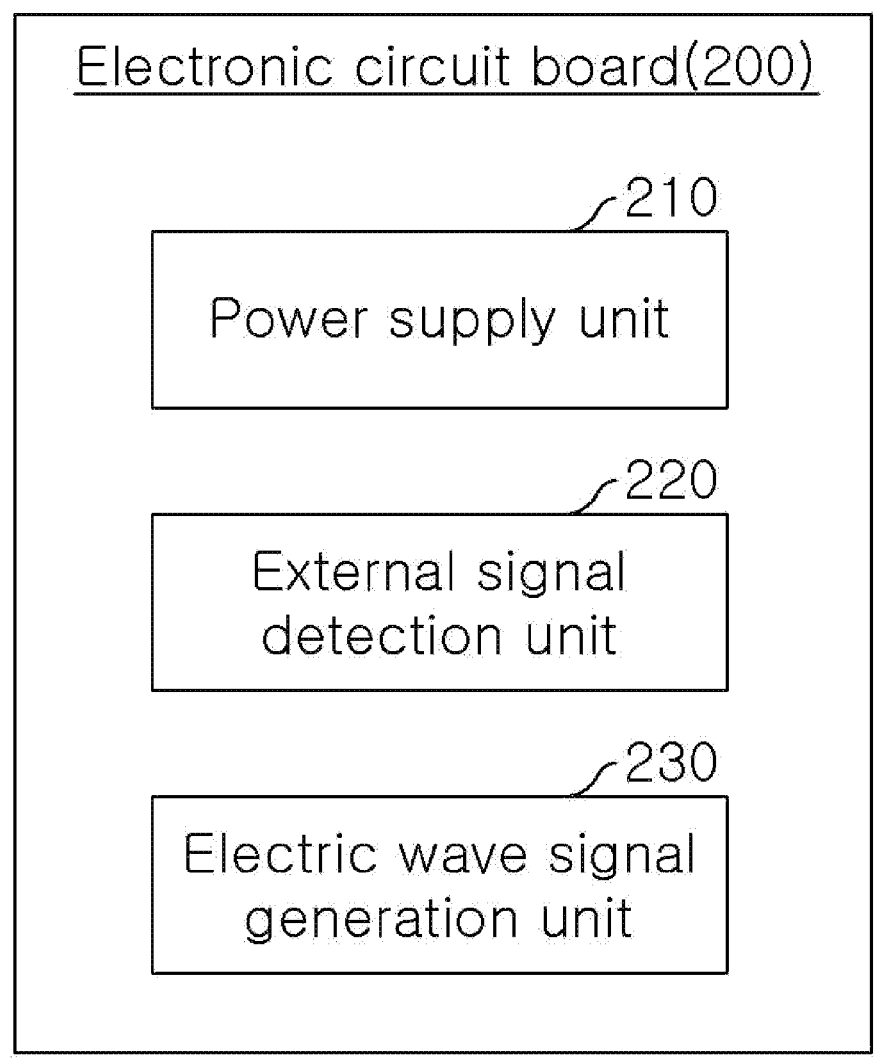
FIG. 2 is a view illustrating a configuration of an electronic circuit board according to the present invention.

FIG. 2 is a view illustrating a configuration of an electronic circuit board according to the present invention.

Specifically, as illustrated in FIG. 2, the electronic circuit board 200 may include a power supply unit 210, an external signal detection unit 220, and an electric wave signal generation unit 230.

The power supply unit 210 may receive external power from the outside of the housing to generate constant voltage power and supply the constant voltage power to the inside of the electronic circuit.

Figure 3:
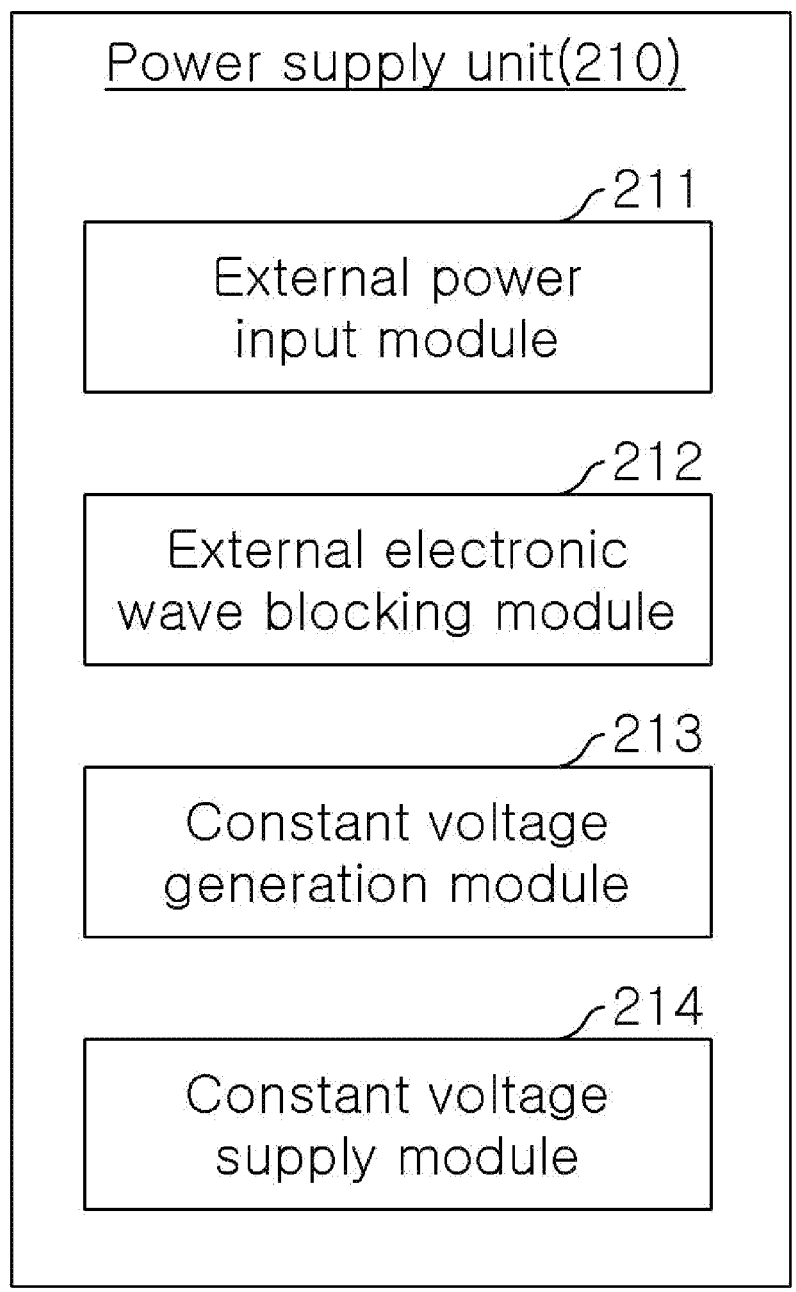
FIG. 3 is a view illustrating a configuration of a power supply unit according to the present invention.

FIG. 3 is a view illustrating a configuration of a power supply unit according to the present invention.

Specifically, as illustrated in FIG. 3, the power supply unit 210 includes an external power input module 211, an external electronic wave blocking module 212, a constant voltage generation module 213, and a constant voltage supply module 214.

The external power input module 211 may receive external power from the outside of the housing. The external power input module 211 may receive external power supplied from a vehicle through a cigarette jack cable connected to the cigarette jack of the vehicle.

The external electronic wave blocking module 212 may block an external electromagnetic wave introduced from the outside of the housing.

Specifically, the external electronic wave blocking module 212 may be formed of an electromagnetic wave blocking filter. This external electronic wave blocking module 212 blocks electromagnetic waves introduced from inside the vehicle, thereby preventing a malfunction of the device due to the corresponding electromagnetic waves.

The constant voltage generation module 213 may generate constant voltage power using external power input to the external power input module.

The constant voltage supply module 214 may supply the constant voltage power generated by the constant voltage generation module to the inside of the electronic circuit, thereby supplying the constant voltage power to the external signal detection unit 220 and the electric wave signal generation unit 230.

The external signal detection unit 220 may sense an external signal generated outside the housing.

Figure 4:
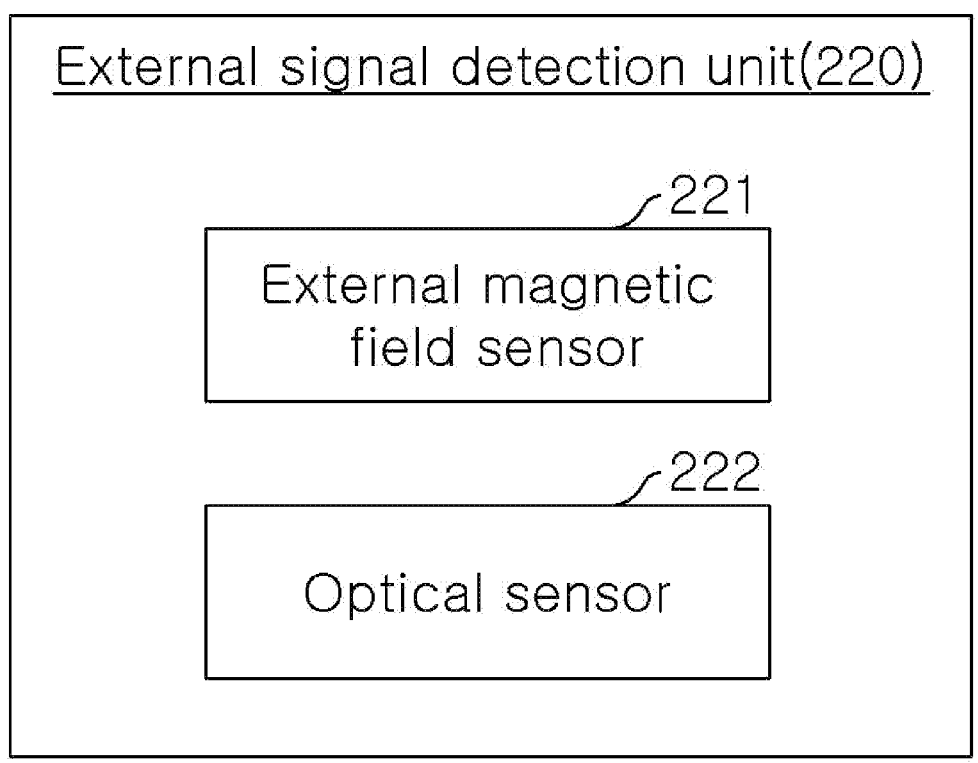
FIG. 4 is a view illustrating a configuration of an external signal sensor according to the present invention.

FIG. 4 is a view illustrating a configuration of an external signal sensor according to the present invention.

Specifically, as illustrated in FIG. 4, the external signal detection unit 220 may include an external magnetic field sensor 221 and an optical sensor 222.

The external magnetic field sensor 221 may sense an external magnetic field generated outside the housing, as an external signal. The external magnetic field sensor 221 may sense an external magnetic field, generated inside the vehicle and introduced to the inside of the housing, and provide the external magnetic field to the electric wave signal generation unit 230.

The optical sensor 222 may sense external light generated outside the housing, as an external signal.

Specifically, when the user forcibly separates the cover 120 from the base to check the inside of the housing, the optical sensor 222 may sense external light introduced from the open top of the base to thereby generate an optical signal, and provide the optical signal to the electric wave signal generation unit 230, thereby stopping the operation of the electric wave signal generation unit 230 as described below.

The electric wave signal generation unit 230 may generate an electric wave signal having a specific frequency and waveform matching the frequency and waveform of the external signal sensed by the external signal detection unit.

Figure 5:
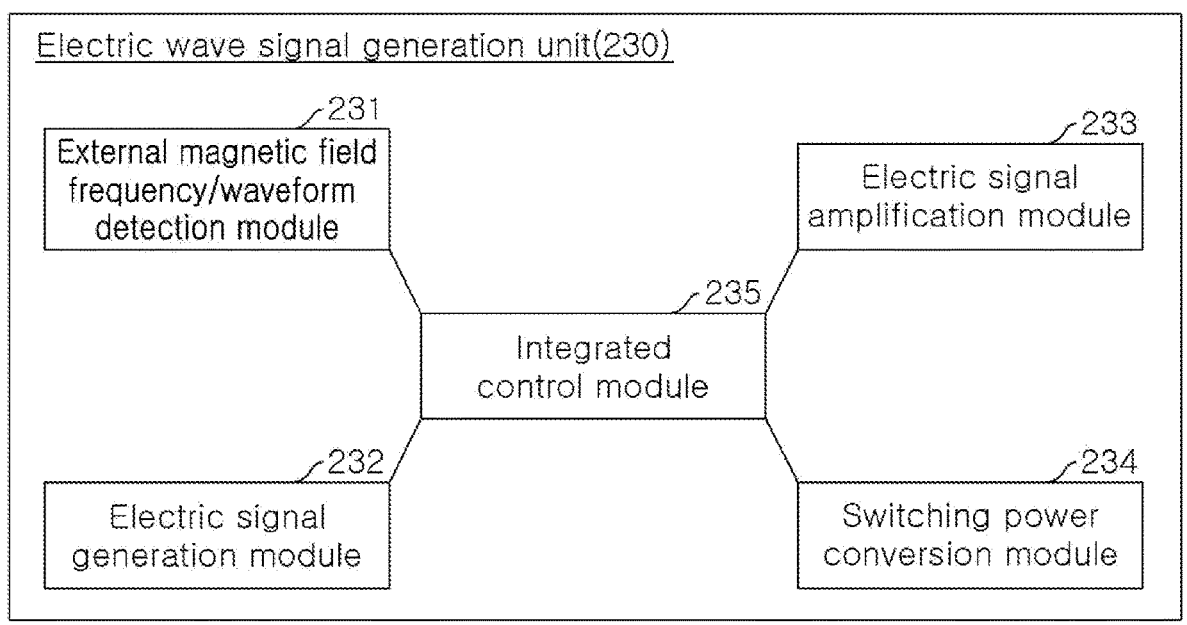
FIG. 5 is a first configuration view of an electric wave signal generator according to the present invention.

FIG. 5 is a first configuration view of an electric wave signal generator according to the present invention.

Specifically, as illustrated in FIG. 5, the electric wave signal generation unit 230 may include an external magnetic field frequency/waveform detection module 231, an electric signal generation module 232, an electric signal amplification module 233, a switching power conversion module 234, and an integrated control module 235.

The external magnetic field frequency/waveform detection module 231 may detect a frequency and a waveform of the external magnetic field sensed by the external signal detection unit using the external magnetic field.

Specifically, the external magnetic field frequency/waveform detection module 231 may receive the external magnetic field inside the vehicle, detected by the external magnetic field sensor 221 and may detect the frequency and waveform of the external magnetic field through a preset detection program.

The electric signal generation module 232 may generate an electric signal having a specific frequency and waveform matching the frequency and waveform of the external magnetic field detected by the external magnetic field frequency/waveform detection module.

Specifically, as described below, the electrical signal generation module 232 may generate a pulsed voltage signal or current signal having the same frequency and waveform, as an electric signal matching the frequency and waveform of the external magnetic field, among electric signals of a few Hz to a few hundreds of MHz, via the integrated control module 235.

The electric signal amplification module 233 may amplify the electric signal generated by the electric signal generation module. The electric signal amplification module 233 may amplify the voltage signal or the current signal generated by the electric signal generation module.

The switching power conversion module 234 may switching-power-convert the electrical signal, amplified by the electric signal amplification module, into an electric wave signal and output the electric wave signal. The switching power conversion module 234 may switching-power-convert the voltage signal or current signal, amplified by the electric signal amplification module, into an electric wave signal and output the electric wave signal.

The integrated control module 235 may control the external magnetic field frequency/waveform detection module, the electrical signal generation module, the electrical signal amplification module, and the switching power conversion module.

Specifically, the integrated control module 235 may be installed with a preset control program for generating an electrical signal of a specific frequency and waveform. The integrated control module 235 may render it possible to generate an electric signal of a specific frequency and waveform that matches the frequency and waveform of the external magnetic field, using the control program, through multi-frequency modulation technology using an output pulse-modulation factor and modulation frequency.

In other words, when the integrated control module 235 receives the frequency and waveform of the external magnetic field, detected by the external magnetic field frequency/waveform detection module, from the external magnetic field frequency/waveform detection module, the integrated control module 235 may control the electric signal generation module to generate a voltage signal or a current signal of a specific frequency and waveform coincident with the frequency and waveform of the external magnetic field, using the multi-frequency modulation technique through the control program.

Further, when the user forcibly removes the cover 120 from the base 110 to check the inside of the housing and thus an optical signal output from the optical sensor is received as described above, the integrated control module 235 may deactivate the control program to thus stop the operation of the electric wave signal generation unit 230.

The coil member 300 may generate a resonant magnetic field through the electric wave signal output from the electronic circuit board and output an electromagnetic resonance wave to the outside of the housing.

Figure 6:
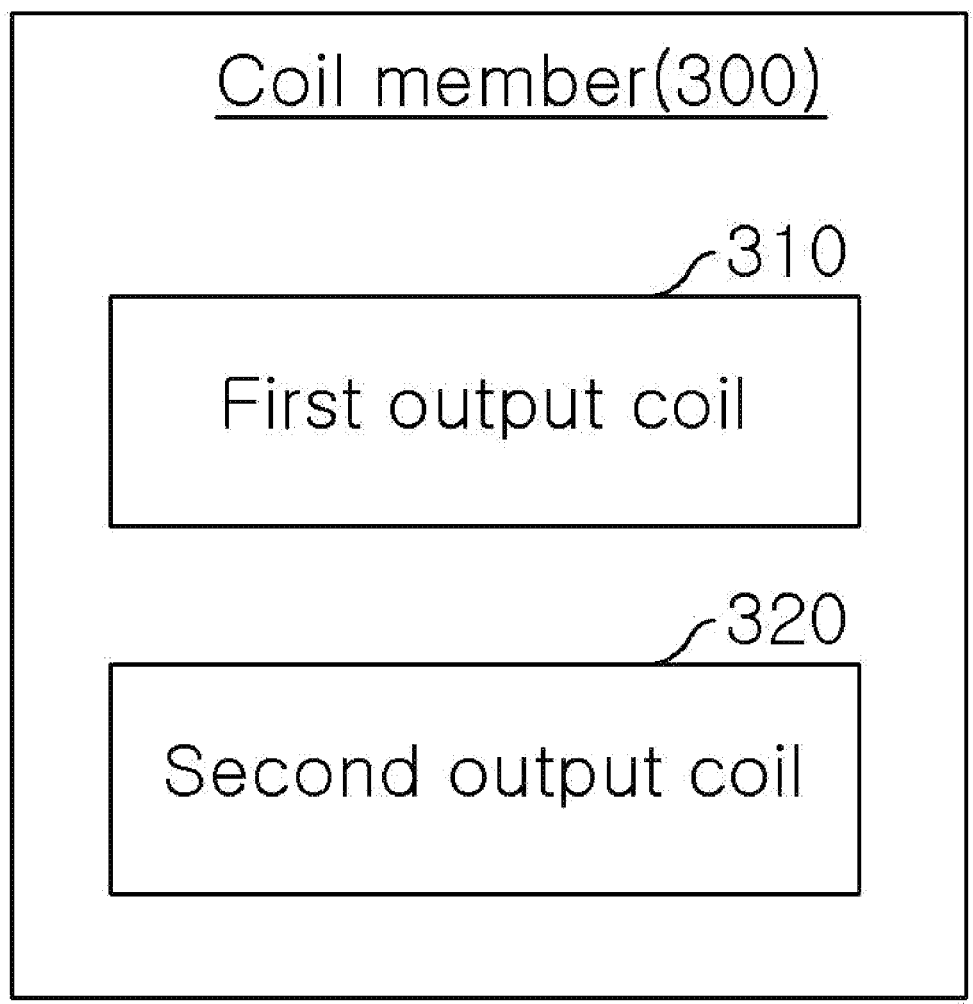
FIG. 6 is a view illustrating a configuration of a coil member according to the present invention.

FIG. 6 is a view illustrating a configuration of a coil member according to the present invention.

Specifically, as illustrated in FIG. 6, the coil member 300 may include a first output coil 310 and a second output coil 320.

The first output coil 310 may generate a resonant magnetic field using the electric wave signal output from the electronic circuit board.

The second output coil 320 may have a vector opposite in direction to that of the first output coil and may generate a resonant magnetic field using the electric wave signal output from the electronic circuit board.

Meanwhile, as illustrated in FIG. 1, the coil receiving part 112 includes a first coil receiving groove 112a and a second coil receiving groove 112b. The first coil receiving groove 112a may be formed in one side portion of the base 110 to receive the first output coil 310, and the second coil receiving groove 112b may be formed in the opposite side portion of the base 110 to receive the second output coil 320.

The first output coil 310 and the second output coil 320 each may generate a resonant magnetic field through the electric wave signal output from the switching power conversion module 234 and output an electromagnetic resonance wave to the outside of the housing, these electromagnetic resonance waves may be irradiated to the device frame of the internal combustion engine or induction motor while interacting with each other.

In the portion of the device frame, where the waves are received, resonance occurs due to interaction with the received waves and, at this time, new waves different in frequency from the received waves are secondarily transferred.

Mostly, secondarily transferred waves are too weak to have a significant effect on the internal combustion engine or induction motor. However, the waves secondarily transferred from the device frame may interact with waves continuously additionally radiated to the device frame may interact and superpose each other, and some superposed waves may be oscillated with a high amplitude and react with the electric charges accumulated in the device frame during high-speed rotation, thereby releasing the electric charges.

In other words, the present invention may remove frictional force due to electromagnetic attractive and repulsive forces by applying a multi-frequency modulation technique and a lattice vibration pattern rearrangement technique which maintains continuous resonance vibrations by forming a specific pattern in the device frame.

Resultantly, according to the present invention, a resonance transfer is induced to allow a specific pattern to be formed in the internal combustion engine and induction motor. Electromagnetic waves superposedly oscillated are radiated to the engine and its surroundings of the vehicle to form superposed electromagnetic waves. The superposed electromagnetic waves may quickly release the electric charges accumulated by high-speed rotation of the engine, thus mitigating overloads of high-speed rotation of the engine and hence enhancing energy and fuel efficiency.

Further, according to the present invention, multi-modulated electromagnetic waves may influence the fuel tank and nozzle of the internal combustion engine through the metal parts of the internal combustion engine and induction motor or a space, thus removing attraction between fuel molecules and hence prompting fuel micronization.

Figure 7:
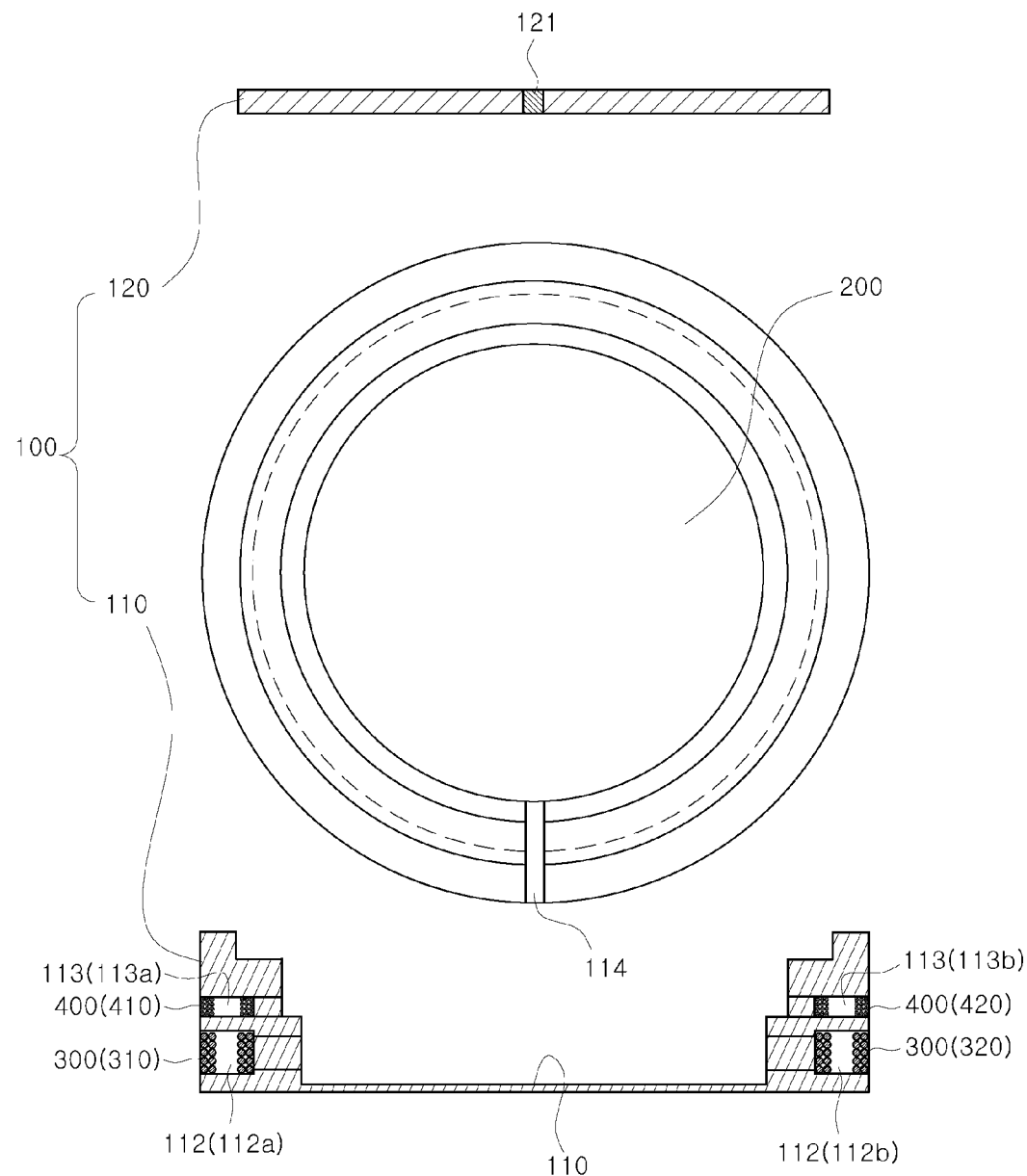
FIG. 7 is a second configuration view of a coil-based electromagnetic wave resonance transfer device for enhancing energy efficiency according to the present invention.

FIG. 7 is a second configuration view of a coil-based electromagnetic wave resonance transfer device for enhancing energy efficiency according to the present invention.

According to the present invention, the coil-based electromagnetic wave resonance transfer device for enhancing energy efficiency may include a resonant magnetic field sensing member 400 inside the housing, in addition to the above-described housing 100, electronic circuit board 200, and coil member 300.

The resonant magnetic field sensing member 400 may sense the resonant magnetic field generated by the coil member 300 and output it to the electronic circuit board 200.

Figure 8:
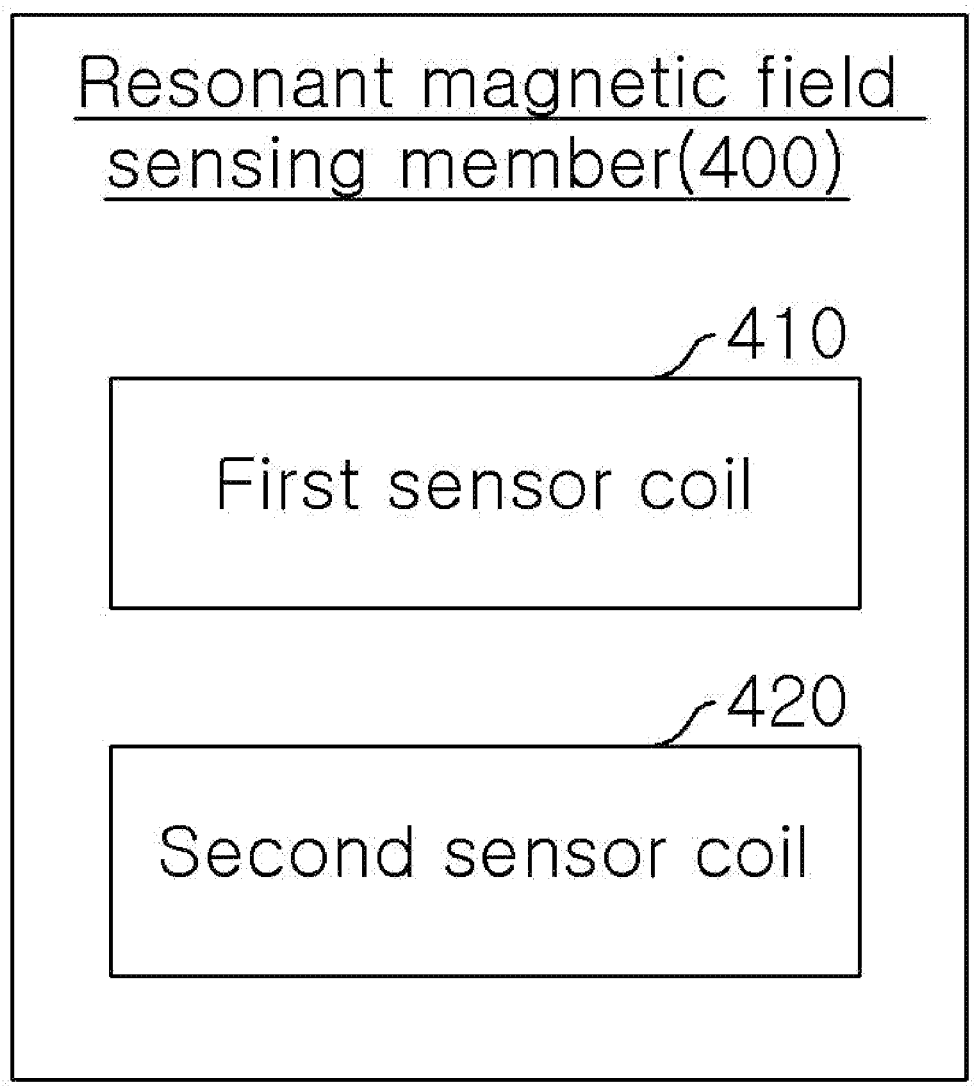
FIG. 8 is a view illustrating a configuration of a resonant magnetic field sensing member according to the present invention.

FIG. 8 is a view illustrating a configuration of a resonant magnetic field sensing member according to the present invention.

Specifically, as illustrated in FIG. 8, the resonant magnetic field sensing member 400 may include a first sensor coil 410 and a second sensor coil 420.

The first sensor coil 410 may sense the resonant magnetic field generated by the first output coil. The first sensor coil 410 may sense the resonant magnetic field generated by the first output coil inside the housing and provide the resonant magnetic field to the electric wave signal generation unit 230.

The second sensor coil 420 may sense the resonant magnetic field generated by the second output coil. The second sensor coil 420 may sense the resonant magnetic field generated by the second output coil inside the housing and provide the resonant magnetic field to the electric wave signal generation unit 230.

The base 120 further includes a sensor receiving part 113 formed in a side portion of the base 110, as illustrated in FIG. 7. The sensor receiving part 113 may be formed over the coil receiving unit 112 to receive the resonant magnetic field sensing member 400.

Specifically, the sensor receiving part 113 may include a first sensor receiving groove 113a and a second sensor receiving groove 113b. The first sensor receiving groove 113a may be formed over the first coil receiving groove 112a, which is a side portion of the base 110, to receive the first sensor coil 410, and the second coil receiving groove 112b may be formed on the second coil receiving groove 112b, which is the opposite side portion of the base 110, to receive the second sensor coil 420.

Figure 9:
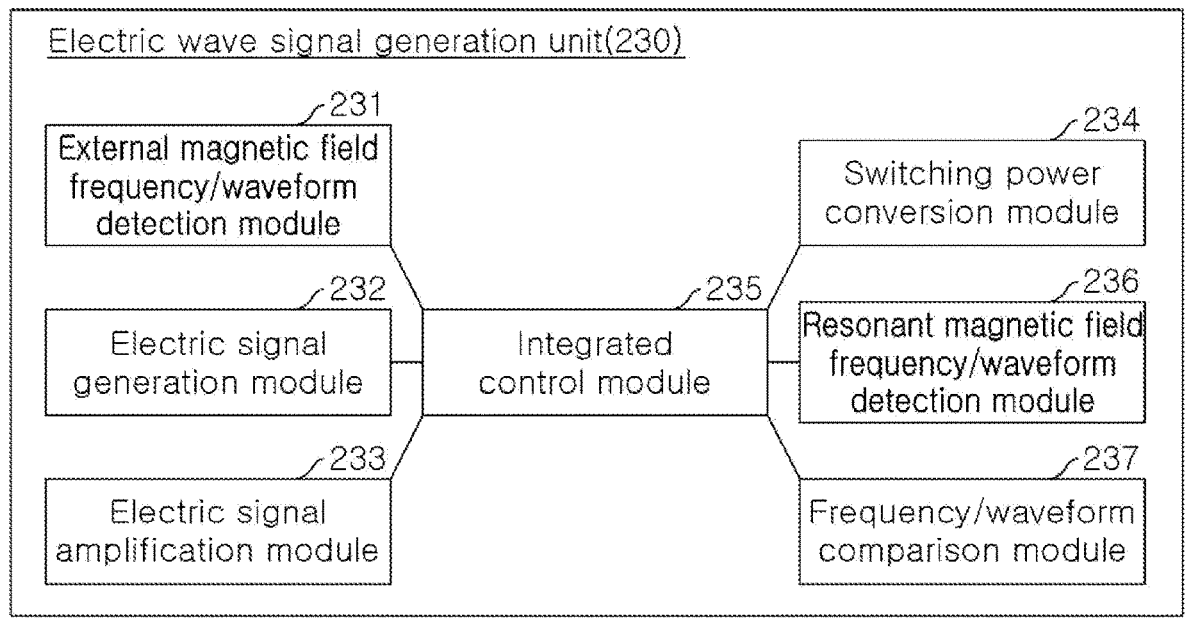
FIG. 9 is a second configuration view of an electric wave signal generator according to the present invention.

FIG. 9 is a second configuration view of an electric wave signal generator according to the present invention.

As illustrated in FIG. 9, an electric wave signal generation unit 230 may further include a resonant magnetic field frequency/waveform detection module 236 and a frequency/waveform comparison module 237, in addition to the above-described external magnetic field frequency/waveform detection module 231, electric signal generation module 232, electric signal amplification module 233, switching power conversion module 234, and the integrated control module 235.

The resonant magnetic field frequency/waveform detection module 236 may detect a frequency and a waveform of the resonant magnetic field sensed by the resonant magnetic field sensing member 400, using the resonant magnetic field.

Specifically, the resonant magnetic field frequency/waveform detection module 236 may receive the resonant magnetic field inside the housing, detected by each of the first sensor coil 410 and the second sensor coil 420 and may detect the frequency and waveform of the resonant magnetic field through a preset detection program.

The frequency/waveform comparison module 237 may compare the frequency and waveform of the resonant magnetic field detected by the resonant magnetic field frequency/waveform detection module 236 with the frequency and waveform of the external magnetic field detected by the external magnetic field frequency/waveform detection module 231.

Specifically, as a result of the comparison, if the resonant magnetic field differs in frequency and waveform from the external magnetic field, the frequency/waveform comparison module 237 may generate a resonant magnetic field abnormality signal.

In this case, upon receiving the resonant magnetic field abnormality signal output from the frequency/waveform comparison module, the integrated control module 235 may deactivate the control program to thereby stop the operation of the electric wave signal generation unit 230.

In other words, upon receiving an optical signal output from the optical sensor or a resonant magnetic field abnormality signal output from the frequency/waveform comparison module, the integrated control module 235 may deactivate the control program to thereby stop the operation of the electric wave signal generation unit 230 and may activate an illuminating member (not shown) or a sounding member (not shown), installed in the housing, to let the user know operation abnormality via light or sound.

As described above, according to the present invention, it is possible to remove frictional force due to electromagnetic attraction and repulsion caused during high-speed rotation of the internal combustion engine or induction motor using low power consumption, prevent twist of the engine rotation shaft, reduce noise and unnecessary heat generation, and prompt fuel micronization using a reduction in attraction between fuel particles to thereby increase energy consumption efficiency.

While examples of coil-based electromagnetic wave resonance transfer device for enhancing energy efficiency has been described above with reference to the drawings, it will be apparent to those of ordinary skill in the art that the present invention is not limited to/by the disclosed embodiments and the drawings and various changes in form and detail may be made thereto without departing from the spirit and scope of the present disclosure as defined by the following claims.

LEGEND OF REFERENCE NUMBERS

100: housing
110: base
111: board seating part
112: coil receiving part
112*a*: first coil receiving groove
112*b*: second coil receiving groove
113: sensor receiving part
113*a*: first sensor receiving groove
113*b*: second sensor receiving groove
114: cable guide part
120: cover
121: display window
200: electronic circuit board
210: power supply unit
211: external power input module
212: external electronic wave blocking module
213: constant voltage generation module
214: constant voltage supply module
220: external signal detection unit
221: external magnetic field sensor
222: optical sensor
230: electric wave signal generation unit
231: external magnetic field frequency/waveform detection module
232: electric signal generation module
233: electric signal amplification module
234: switching power conversion module
235: integrated control module
236: resonant magnetic field frequency/waveform detection module
237: frequency/waveform comparison module
300: coil member
310: first output coil
320: second output coil
400: resonant magnetic field sensing member
410: first sensor coil
420: second sensor coil

The invention claimed is:

1. A coil-based electromagnetic wave resonance transfer device for enhancing energy efficiency, comprising:
a housing;
an electronic circuit board installed inside the housing and sensing an external signal generated from an outside of the housing, and generating an electric wave signal of a frequency-adjusted specific waveform using a multi-frequency modulation scheme; and
a coil member installed inside the housing, generating a resonant magnetic field through the electric wave signal output from the electronic circuit board, and outputting an electromagnetic resonance wave to the outside of the housing, wherein the housing includes:
a base on which the electronic circuit board and the coil member are installed; and
a cover coupled to an upper part of the base and sealing an inside of the base, wherein the base includes:
a board seating part formed on a bottom of the base to seat the electronic circuit board thereon; and
a coil receiving unit formed in a side portion of the base to receive the coil member, and wherein the cover includes a display window to indicate whether the coil-based electromagnetic wave resonance transfer device operates, wherein the electronic circuit board includes:
a power supply unit receiving external power from the outside of the housing, generating constant voltage power, and supplying the constant voltage power to an inside of an electronic circuit:
an external signal detection unit sensing an external signal generated from the outside of the housing; and
an electric wave signal generation unit generating an electric wave signal of a specific frequency and waveform matching a frequency and waveform of the external signal sensed by the external signal detection unit, and wherein the power supply unit includes:
an external power input module receiving external power from the outside of the housing;
an external electronic wave blocking module blocking an external electronic wave introduced from the outside of the housing;
a constant voltage generation module generating the constant voltage power using the external power input to the external power input module; and
a constant voltage supply module supplying the constant voltage power generated by the constant voltage generation module to the inside of the electronic circuit.

2. The coil-based electromagnetic wave resonance transfer device of claim 1, wherein the external signal detection unit includes an external magnetic field sensor sensing an external magnetic field generated outside the housing, as the external signal.

3. The coil-based electromagnetic wave resonance transfer device of claim 2, wherein the electric wave signal generation unit includes:
an external magnetic field frequency/waveform detection module detecting a frequency and waveform of the external magnetic field sensed by the external signal detection unit, using the external magnetic field;
an electric signal generation module generating an electric signal including a voltage signal or a current signal of a specific frequency and waveform matching the frequency and waveform of the external magnetic field detected by the external magnetic field frequency/waveform detection module;
an electric signal amplification module amplifying the electric signal generated by the electric signal generation module;
a switching power conversion module outputting an electric wave signal by switching-power-converting the electric signal amplified by the electric signal amplification module; and
an integrated control module controlling the external magnetic field frequency/waveform detection module, the electric signal generation module, the electric signal amplification module, and the switching power conversion module, and wherein after receiving the frequency and waveform of the external signal detected by the external magnetic field frequency/waveform detection module, the integrated control module controls the electric signal generation module to generate the electric signal of the specific frequency and waveform matching the frequency and waveform of the external magnetic field using a multi-frequency modulation scheme through a preset control program.

4. The coil-based electromagnetic wave resonance transfer device of claim 3, wherein the coil member includes:
a first output coil generating a resonant magnetic field using the electric wave signal output from the electronic circuit board; and
a second output coil having a vector opposite in direction to the first output coil and generating the resonant magnetic field using the electric wave signal output from the electronic circuit board, and wherein the coil receiving unit includes:
a first coil receiving groove formed in a side portion of the base to receive the first output coil; and
a second coil receiving groove formed in another side portion of the base to receive the second output coil.

5. The coil-based electromagnetic wave resonance transfer device of claim 4, wherein the external signal detection unit further includes an optical sensor sensing external light generated from the outside of the housing, as the external signal, wherein the optical sensor senses the external light to generate an optical signal when the cover is removed from the base, and wherein the integrated control module receives the optical signal output from the optical sensor and deactivates the control program.

6. The coil-based electromagnetic wave resonance transfer device of claim 5, further comprising a resonant magnetic field sensing member installed inside the housing to sense the resonant magnetic field generated from the coil member, and wherein the resonant magnetic field sensing member includes:
a first sensor coil sensing a resonant magnetic field generated from the first output coil; and
a second sensor coil sensing a resonant magnetic field generated from the second output coil.

7. The coil-based electromagnetic wave resonance transfer device of claim 6, wherein the base further includes a sensor receiving part formed, over the coil receiving unit, in a side portion of the base to receive the resonant magnetic field sensing member, and wherein the sensor receiving unit includes:
a first sensor receiving groove formed in a side portion of the base to receive the first sensor coil; and
a second sensor receiving groove formed in another side portion of the base to receive the second sensor coil.

8. The coil-based electromagnetic wave resonance transfer device of claim 7, wherein the electric wave signal generation unit includes:
a resonant magnetic field frequency/waveform detection module detecting a frequency and waveform of a resonant magnetic field sensed by the resonant magnetic field sensing member, using the resonant magnetic field; and
a frequency/waveform comparison module comparing the frequency and waveform of the resonant magnetic field detected by the resonant magnetic field frequency/waveform detection module with the frequency and waveform of the external magnetic field detected by the external magnetic field frequency/waveform detection module, wherein the frequency/waveform comparison module generates a resonant magnetic field abnormality signal when the frequency and waveform of the resonant magnetic field differ from the frequency and waveform of the external magnetic field, and wherein the integrated control module receives the resonant magnetic field abnormality signal from the frequency/waveform comparison module and deactivates the control program.

9. The coil-based electromagnetic wave resonance transfer device of claim 8, wherein upon receiving the optical signal output from the optical sensor or the resonant magnetic field abnormality signal output from the frequency/waveform comparison module, the integrated control module activates an illuminating member or a sounding member installed in the housing to let a user know operation abnormality of the coil-based electromagnetic wave resonance transfer device.

* * * * *